United States Patent
Liang et al.

(10) Patent No.: US 10,763,513 B2
(45) Date of Patent: ***Sep. 1, 2020

(54) CURRENT COLLECTOR, ELECTRODE PLATE INCLUDING THE SAME AND BATTERY

(71) Applicant: CONTEMPORARY AMPEREX TECHNOLOGY CO., LIMITED, Ningde, Fujian Province (CN)

(72) Inventors: Chengdu Liang, Ningde (CN); Huafeng Huang, Ningde (CN); Qisen Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/209,317

(22) Filed: Dec. 4, 2018

(65) Prior Publication Data

US 2019/0173092 A1 Jun. 6, 2019

(30) Foreign Application Priority Data

Dec. 5, 2017 (CN) .......................... 2017 1 1267311

(51) Int. Cl.
*H01M 4/66* (2006.01)
*H01M 10/0525* (2010.01)
(Continued)

(52) U.S. Cl.
CPC ............. *H01M 4/667* (2013.01); *H01M 4/64* (2013.01); *H01M 4/661* (2013.01); *H01M 4/662* (2013.01);
(Continued)

(58) Field of Classification Search
None
See application file for complete search history.

(56) References Cited

U.S. PATENT DOCUMENTS 8,399,113 B2 * 3/2013 Nakura ................. H01M 2/348
429/163
2004/0126654 A1 7/2004 Sudano et al.
(Continued)

FOREIGN PATENT DOCUMENTS

CN 107123812 A 9/2017
CN 107369810 A 11/2017
(Continued)

OTHER PUBLICATIONS

European Search Report from corresponding European Patent Application No. 18200697.3, dated Jun. 6, 2019, 4 pages.
(Continued)

*Primary Examiner* — Rena Dye Cronin
(74) *Attorney, Agent, or Firm* — Tucker Ellis LLP

(57) ABSTRACT

The present disclosure provides a current collector, an electrode plate, and a battery. The current collector includes an insulation layer, a conductive layer and at least one protective layer. The insulation layer is used to support the conductive layer. The conductive layer is used to support an electrode active material layer and located above at least one surface of the insulation layer. The conductive layer has a thickness of D2 satisfying 300 nm≤D2≤2 μm. The at least one protective layer is arranged on at least one surface of the conductive layer.

20 Claims, 4 Drawing Sheets

(51) Int. Cl.
  H01M 10/052 (2010.01)
  H01M 4/02 (2006.01)
  H01M 10/42 (2006.01)
  H01M 4/64 (2006.01)

(52) U.S. Cl.
  CPC ........... H01M 4/663 (2013.01); H01M 4/664 (2013.01); H01M 4/668 (2013.01); H01M 10/052 (2013.01); H01M 10/0525 (2013.01); H01M 10/4235 (2013.01); H01M 2004/028 (2013.01)

(56) References Cited

U.S. PATENT DOCUMENTS

| | | | |
|---|---|---|---|
| 2004/0126663 | A1 | 7/2004 | Sudano et al. |
| 2011/0052985 | A1* | 3/2011 | Kashiwazaki ......... H01G 11/38 429/217 |
| 2012/0052378 | A1* | 3/2012 | Torata ................... H01M 4/13 429/209 |
| 2013/0017441 | A1* | 1/2013 | Affinito ............... H01M 2/1673 429/211 |
| 2017/0187036 | A1 | 6/2017 | Endo |
| 2017/0309951 | A1* | 10/2017 | Ishikawa ................. H01M 2/34 |

FOREIGN PATENT DOCUMENTS

| | | |
|---|---|---|
| CN | 206849947 U | 1/2018 |
| EP | 2482368 A1 | 8/2012 |
| JP | 2004273304 A | 9/2004 |
| JP | 2006512722 A | 4/2006 |

OTHER PUBLICATIONS

Office Action from corresponding Japanese Patent Application No. 2018-153034, dated Oct. 8, 2019, 4 pages.

Office Action (Communication Pursuant to Article 94(3) EPC) from corresponding European Application No. 18200697.3, dated Sep. 16, 2019, 6 pages.

* cited by examiner

CURRENT COLLECTOR, ELECTRODE PLATE INCLUDING THE SAME AND BATTERY

CROSS-REFERENCE TO RELATED DISCLOSURES

The present disclosure claims priority to Chinese Patent Disclosure No. 201711267311.4, filed on Dec. 5, 2017, the content of which is incorporated herein by reference in its entirety.

TECHNICAL FIELD

The present disclosure relates to the field of batteries and, particularly, relates to a current collector, an electrode plate including the current collector, and a battery.

BACKGROUND

Lithium ion batteries have been widely used in electric vehicles and consumer electronics due to their advantages such as high energy density, high output power, long cycle life, and low environmental pollution. However, when the lithium ion batteries are subjected to abnormal conditions such as extrusion, collision, or puncture, they can easily to catch fire or explode, causing serious problems. Therefore, the safety issue of the lithium ion batteries greatly limits the disclosure and popularization of the lithium ion batteries.

A large number of experimental results show that an internal short circuit in a battery is the ultimate cause of safety hazards of the lithium ion batteries. In order to avoid the internal short circuit in the battery, researchers tried to improve the separator structure, battery mechanical structure and so on. Some of these studies have improved the safety performance of the lithium ion batteries by modifying the design of current collectors.

The temperature in the battery may rise when an internal short circuit occurs in the battery due to abnormal conditions such as collision, extrusion, or puncture and on the like. According to a technical solution in the related art, there is a technical solution in which alloy having a low melting point is added into the material of a metal current collector. With increasing of the temperature of the battery, the alloy having low-melting point in the current collector begins to melt, thereby resulting in a broken circuit of an electrode plate and cutting off the current. In this way, the safety of the battery is improved. According to another technical solution in the prior art, a multilayered current collector is adopted, in which both sides of a resin layer are connected with metal layers to form a composite. When the temperature of the battery reaches a melting point of the material of the resin layer, the resin layer of the current collector melts to damage the electrode plate, thereby cutting off the current and enhancing the safety of the battery.

However, these solutions in the related art cannot effectively prevent the occurrence of the internal short circuit in the lithium ion battery, and cannot guarantee that the battery can continue to operate under the abnormal conditions. In the above solutions, the temperature in the battery would still rise sharply after the internal short circuit occurs in the battery. When the battery temperature rises sharply, danger of varying degrees would still occur if the safety component cannot respond quickly. In these solutions, even the safety component responds and successfully avoids the hazard of the battery, the battery cannot continue to operate.

Therefore, it is necessary to provide designs of a current collector and a battery that can effectively prevent accidents such as firing and explosion caused by the occurrence of the internal short circuit under the abnormal conditions such as collision, extrusion, or puncture, without affecting the normal operation of the battery.

SUMMARY

The present disclosure provides a current collector, an electrode plate and a battery.

In a first aspect of the present disclosure, a current collector is provided. The current collector includes: an insulation layer, a conductive layer and at least one protective layer. The insulation layer is used to support the conductive layer. The conductive layer is used to support an electrode active material layer and located above at least one surface of the insulation layer. The conductive layer has a thickness of D2 satisfying 300 nm≤D2≤2 µm. The at least one protective layer is arranged on at least one surface of the conductive layer.

In a second aspect of the present disclosure, an electrode plate is provided. The electrode plate includes a current collector according to the first aspect of the present disclosure.

In a third aspect of the present disclosure, a battery is provided. The battery includes the electrode plate according to the second aspect of the present disclosure.

The technical solution of the present disclosure has at least the following beneficial effects.

For the current collector of the present disclosure, a conductive layer having a protective layer is provided on the surface of the insulating layer, and the thickness D2 of the conductive layer satisfies the condition of 300 nm≤D2≤2 µm. On one hand, the current collector of the present disclosure can improve the short circuit resistance of the battery when the short circuit occurs under abnormal conditions, such that the short circuit current can be greatly reduced, and thus the heat generated by the short circuit can be greatly reduced, thereby improving the safety performance of the battery. On the other hand, the protective layer of the current collector of the present disclosure can further improve the mechanical strength of the conductive layer, further improve the safety performance of the battery, and at the same time effectively prevent the conductive layer from being damaged, oxidized or corroded, etc., and thus significantly improve an operating stability and a service life of the current collector.

In an alternative technical solution of the present disclosure, on the positive current collector, a protective layer is disposed on a surface of the conductive layer facing away from the insulating layer, and is made of metal oxide. This can further improve the short circuit resistance of the battery when the short circuit occurs under abnormal conditions, and improve the safety performance of the battery.

Figure 1:
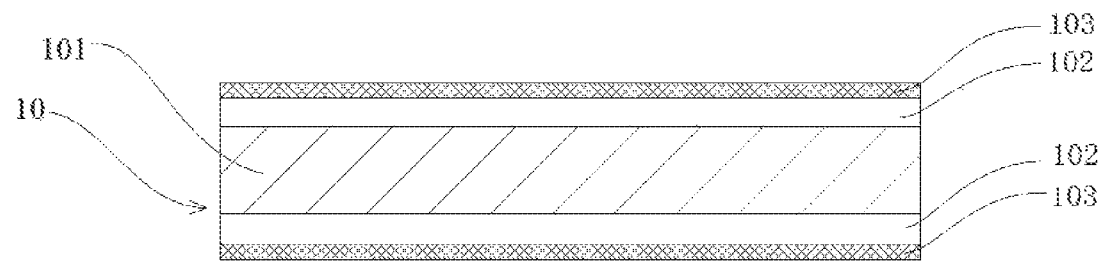
FIG. 1 is a structural schematic diagram of a positive current collector according to an embodiment of the present disclosure.

in which:
1—positive electrode plate;
10—positive current collector;
101—positive insulation layer,
102—positive conductive layer,
103—positive protective layer;
11—positive active material layer;
2—negative electrode plate;
201—negative insulation layer,
202—negative conductive layer;
203—negative protective layer;
20—negative current collector,
21—negative active material layer,
3—separator;
4—nail.

DESCRIPTION OF EMBODIMENTS

Hereafter, the present disclosure will be further described in combination with specific embodiments. It should be understood that these embodiments are only for illustrating the present disclosure and do not limit the scope of the present disclosure.

The structure and performance of the current collector proposed in the first aspect of the embodiments of the present disclosure will be described in detail below.

An embodiment of the present disclosure relates to a current collector, including an insulation layer, a conductive layer and a protective layer. The insulation layer is used to support the conductive layer; the conductive layer is used to support an electrode active material layer and located above at least one surface of the insulation layer, the conductive layer has a thickness D2 satisfying: 300 nm≤D2≤2 μm, and the protective layer is arranged on at least one surface of the conductive layer.

The insulation layer in the current collector of the present disclosure is non-conductive, so its resistance is large. This can improve the short circuit resistance of the battery when the short circuit occurs under abnormal conditions, such that the short circuit current can be greatly reduced, and thus the heat generated by the short circuit can be greatly reduced, thereby improving the safety performance of the battery. In addition, the weight energy density of the battery can be increased by replacing the conventional current collector of metal foil with an insulation layer. Meanwhile, the current collector of the present disclosure further includes a conductive layer having a protective layer on the surface of the insulation layer and having a specific thickness. On one hand, the conductive layer can ensure that the current collector can provide electrons to the electrode active material layer, that is, it has the effects of conduction and current collection. On the other hand, the specific thickness can further allow the current collector to have a larger insistence, thereby ensuring the safety performance of the battery and further allowing the battery to have a large weight energy density. Thirdly, the protective layer can further improve the overall mechanical strength of the current collector, further improve the safety performance of the battery, and at the same time effectively prevent the conductive layer from being damaged, oxidized or corroded, etc., and thus significantly improve an operating stability and a service life of the current collector.

[Conductive Layer]

In the current collector of the embodiments of the present disclosure, the conductive layer has a thickness of D2 satisfying: 300 nm≤D2≤2 μm.

The material of the conductive layer is at least one of a metallic conductive material and a carbon-based conductive material. The metallic conductive material is preferably at least one of aluminum, copper, nickel, titanium, silver, nickel-copper alloy, and aluminum-zirconium alloy. The carbon-based conductive material is preferably at least one of graphite, acetylene black, graphene, and carbon nanotube.

In existing lithium ion batteries, when an internal short circuit occurs in the battery under abnormal conditions, a large current would be instantaneously generated, and a large quantity of heat is generated by the short circuit accordingly. The heat may usually further initiate alumino-thermal reaction at the aluminum foil collector of the positive electrode, which may further cause the battery to fire and explode.

In the embodiments of the present disclosure, the above technical problems are solved by using a special current collector which is supported by an insulation layer and has a conductive layer with a specific thickness. Because the insulation layer is non-conductive, the resistance of the current collector according to the present disclosure is large. This can improve the short circuit resistance of the battery when the short circuit occurs under abnormal conditions, such that the short circuit current can be greatly reduced, and thus the heat generated by the short circuit can be greatly reduced, thereby improving the safety performance of the battery.

The internal resistance of the battery usually includes an ohmic internal resistance of the battery and a polarization internal resistance of the battery. An active material resistance, a current collector resistance, an interface resistance, an electrolyte composition and the like may all have a significant influence on the internal resistance of the battery.

When a short circuit occurs under abnormal conditions, the internal resistance of the battery may be greatly reduced due to the occurrence of an internal short circuit. Therefore, increasing the resistance of the current collector can increase the internal resistance of the battery after the short circuit, thereby improving safety performance of the battery.

The thickness of the conductive layer can meet the requirements if it is sufficient to have the effects of conduction and current collection. If the thickness of the conductive layer is too small, the effect of conduction and current collection is poor, the polarization of the battery may be large, and it is likely to be broken during the processing process of the electrode plate or the like. If the thickness of the conductive layer is too large, it may affect the weight energy density of the battery and may reduce the resistance of the current collector, which is not conducive to improving the safety performance of the battery.

In the embodiments of the present disclosure, an upper limit of the thickness D2 of the conductive layer may be 2 μm, 1.8 μm, 1.5 μm, 1.2 μm, 1 μm, or 900 nm. A lower limit of the thickness D2 of the conductive layer may be 800 nm, 700 nm, 600 nm, 500 nm, 450 nm, 400 nm, 350 nm, or 300 nm. The thickness of the conductive layer D2 can be in a range consisting of any one upper limit and any one lower limit. Preferably, 500 nm≤D2≤1.5 μm.

The conductive layer can be formed on the insulation layer by means of at least one of mechanical rolling, bonding, vapor deposition, and electroless plating. The vapor deposition is preferably physical vapor deposition (PVD). Preferably, the physical vapor deposition is at least one of evaporation deposition and sputtering deposition. The evaporation deposition is preferably at least one of vacuum evaporation, thermal evaporation deposition, or electron beam evaporation method (EBEM). The sputtering deposition is preferably magnetron sputtering.

[Protective Layer]

In the present disclosure, a protective layer is arranged on at least one surface of the conductive layer of the current collector. The protective layer can improve the mechanical strength of the conductive layer, further improve the safety performance of the battery, and at the same time effectively prevent the conductive layer from being damaged, oxidized or corroded, etc., and significantly improve an operating stability and a service life of the current collector.

The material of the protective layer is at least one of metal, metal oxide, and conductive carbon. The metal is preferably selected from at least one of nickel, chromium, nickel-based alloy (such as nickel-chromium alloy), and copper-based alloy (such as copper-nickel alloy). The metal oxide is preferably at least one of aluminum oxide, cobalt oxide, chromium oxide, and nickel oxide. The conductive carbon is preferably selected from at least one of conductive carbon black, carbon nanotube, acetylene black, and graphene.

The nickel-chromium alloy is an alloy made of metallic nickel and metallic chromium. In an embodiment, the mole ratio of nickel element to chromium element is 1:99 to 99:1.

A copper-based alloy is an alloy formed by adding one or more other elements to a matrix of pure copper. The copper-nickel alloy is preferable. In an embodiment, the mole ratio of nickel element to copper element in the copper-nickel alloy is 1:99 to 99:1.

In the embodiments of the present disclosure, for the convenience of description, when the protective layer is arranged on a surface of the conductive layer facing away from the insulation layer (i.e., the upper surface of the conductive layer), it is referred to as an upper protective layer; and when the protective layer is arranged on a surface of the conductive layer facing towards the insulation layer (i.e., the lower surface of the conductive layer), it is referred to as a lower protective layer.

As a further improvement for the current collector according to the embodiments of the present disclosure, the upper protection layer has a thickness of D3 satisfying: D3≤1/10 D2 and 1 nm≤D3≤200 nm, i.e., the thickness is smaller than or equal to 1/10 of the thickness D2 and is in a range of 1 nm to 200 nm. The lower protective layer has a thickness of D3' satisfying: D3'≤1/10 D2 and 1 nm≤D3'≤200 nm.

An upper limit of the thicknesses D3 and D3' of the protective layer can be 200 nm, 180 nm, 150 nm, 120 nm, 100 nm, 80 nm, 60 nm, 55 nm, 50 nm, 45 nm, 40 nm, 30 nm, or 20 nm. A lower limit of the thicknesses D3 and D3' of the protective layer can be 1 nm, 2 nm, 5 nm, 8 nm, 10 nm, 12 nm, 15 nm, or 18 nm. The thicknesses D3 and D3' of the protective layer can be in a range consisting of any one upper limit and any one lower limit. If the protective layer is too thin, it has limited effect on protecting the conductive layer; and if the protective layer is too thick, the weight energy density and volume energy density of the battery can be reduced. Preferably, 10 nm≤D3≤50 nm, and preferably 10 nm≤D3'≤50 nm.

From the viewpoint of an accounting proportion of the protective layer in the entire thickness of the conductive layer, D3 satisfies: 1/2000 D2≤D3≤1/10 D2, that is, the thickness of the protective layer is 1/2000 to 1/10 of D2, and more preferably, D3 satisfies: 1/1000 D2≤D3≤1/10 D2.

The protective layer can be formed on the conductive layer by means of vapor deposition, an in-situ formation method, a coating method, or the like. With respect to the vapor deposition, physical vapor deposition (PVD) is preferable. Preferably, the physical vapor deposition is at least one of evaporation deposition and sputtering deposition. The evaporation deposition is preferably at least one of vacuum evaporating, thermal evaporation deposition, electron beam evaporation method (EBEM). As regards the sputtering deposition, magnetron sputtering is preferable. The in-situ formation method is preferably an in-situ passivation method, i.e., a method for in-situ forming a metal oxide passivation layer on a metal surface. The coating method is preferably one of roll coating, extrusion coating, blade coating, gravure coating, and the like.

FIGS. 1 to 8 are structural schematic diagrams of current collectors according to embodiments of the present disclosure.

FIGS. 1 to 4 show positive current collectors.

In FIG. 1, the positive current collector 10 includes a positive insulation layer 101 and two positive conductive layers 102 provided above two opposite surfaces of the positive insulation layer 101. A positive protective layer 103, which is also referred as to an upper protective layer, is arranged on a surface of each positive conductive layer 102 facing away from the positive insulation layer 101.

Figure 2:
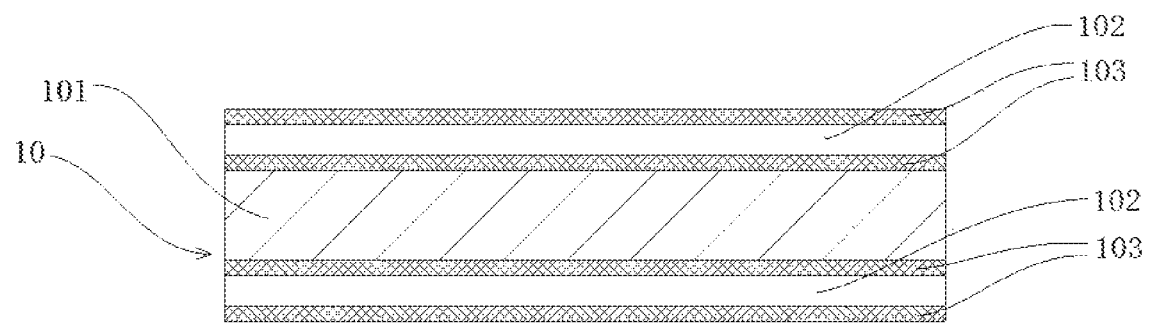
FIG. 2 is a structural schematic diagram of a positive current collector according to another embodiment of the present disclosure.

In FIG. 2, the positive current collector 10 includes a positive insulation layer 101 and two positive conductive layers 102 arranged above two opposite surfaces of the positive insulation layer 101. Two positive protective layers 103 are arranged on two opposite surfaces of each positive conductive layer 102.

Figure 3:
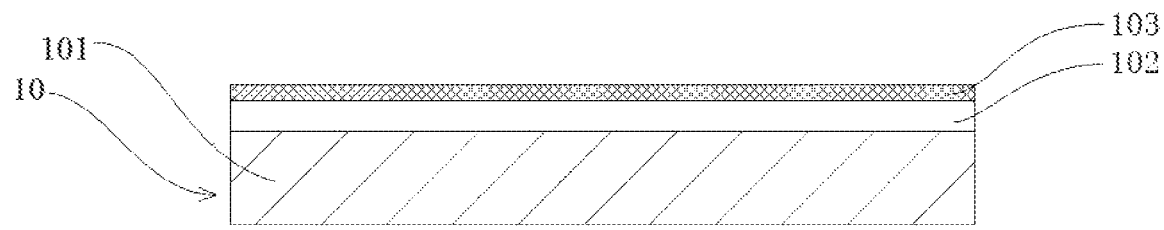
FIG. 3 is a structural schematic diagram of a positive current collector according to another embodiment of the present disclosure.

In FIG. 3, the positive current collector 10 includes a positive insulation layer 101 and a positive conductive layer 102 arranged above one surface of the positive insulation layer 101. A positive protective layer 103, which is also referred as to an upper protective layer, is arranged on a surface of the positive conductive layer 102 facing away from the positive insulation layer 101.

Figure 4:
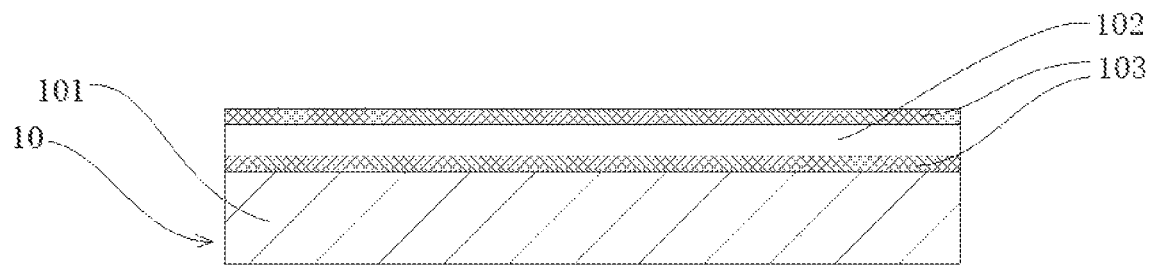
FIG. 4 is a structural schematic diagram of a positive current collector according to another embodiment of the present disclosure.

In FIG. 4, the positive current collector 10 includes a positive insulation layer 101 and a positive conductive layer 102 arranged above one surface of the positive insulation layer. Two positive protective layers 103 are arranged on two opposite surfaces of the positive conductive layer 102.

Similarly, FIGS. 5 to 8 show negative current collectors.

Figure 5:
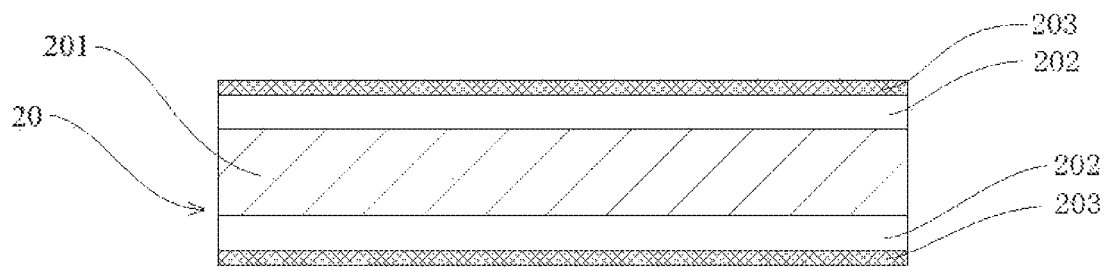
FIG. 5 is a structural schematic diagram of a negative current collector according to an embodiment of the present disclosure.

In FIG. 5, the negative current collector 20 includes a negative insulation layer 201 and two negative conductive layers 202 arranged above two opposite surfaces of the negative insulation layer 201. A negative protective layer 203, which is also referred as to an upper protective layer, is arranged on a surface of each negative conductive layer 202 facing away from the negative insulation layer 201.

Figure 6:
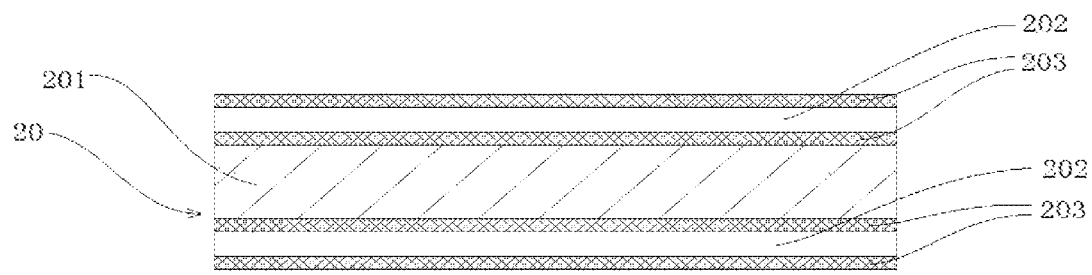
FIG. 6 is a structural schematic diagram of a negative current collector according to another embodiment of the present disclosure.

In FIG. 6, the negative current collector 20 includes a negative insulation layer 201 and two negative conductive layers 202 arranged above two opposite surfaces of the negative insulation layer 201. Two negative electrode protective layers 203 are arranged on two opposite surfaces of each negative conductive layer 202.

Figure 7:
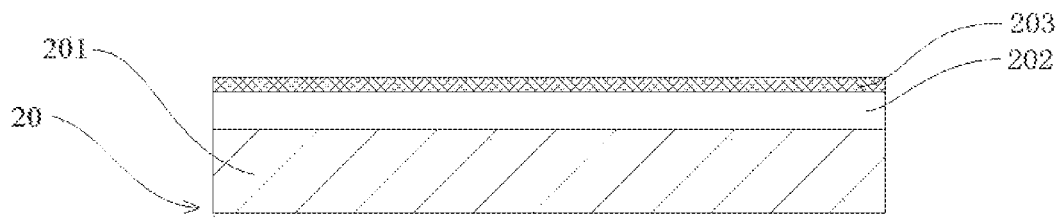
FIG. 7 is a structural schematic diagram of a negative current collector according to another embodiment of the present disclosure.

In FIG. 7, the negative current collector 20 includes a negative insulation layer 201 and a negative conductive layer 202 arranged above one surface of the negative insulation layer 201. A negative protective layer 203, which is also referred as to an upper protective layer, is arranged on a surface of the negative conductive layer 202 facing away from the negative insulation layer 201.

Figure 8:
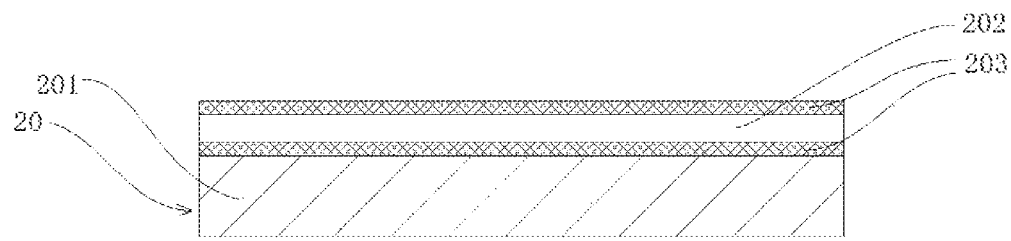
FIG. 8 is a structural schematic diagram of a negative current collector according to another embodiment of the present disclosure.

In FIG. 8, the negative current collector 20 includes a negative insulation layer 201 and a negative conductive layer 202 arranged above one surface of the negative insulation layer. Two negative protective layers 203 are arranged on two opposite surfaces of the negative conductive layer 202.

Here, it should be noted that the protective layer can also be provided only on the surface of the conductive layer facing towards the insulation layer.

The materials of the protective layer on the two opposite surfaces of the conductive layer may be the same or different, and the thickness thereof may be the same or different.

Further, in some embodiments, the current collector according to the embodiments of the present disclosure is a positive current collector. The positive current collector includes a protective layer arranged on a surface of the conductive layer facing away from the insulation layer (i.e., an upper surface of the conductive layer). Hereinafter, such protective layer is referred to as an upper protective layer. The material of the upper protective layer is metal oxide. Specifically, the metal oxide may be selected from at least one of aluminum oxide, cobalt oxide, chromium oxide, and nickel oxide.

Firstly, the protective layer on the upper surface of the metal oxide material has a large resistance, so such protective layer can further increase the resistance of the positive current collector to some extent, thereby further improving the short circuit resistance of the battery when a short circuit occurs under abnormal conditions and thus improving safety performance of the battery. Secondly, since the metal oxide has low ductility and high hardness, the upper protective layer can further increase the mechanical strength of the positive current collector. Thirdly, the specific surface area of the metal oxide is larger than that of the metal, such that a bonding force between the protective layer made of the metal oxide material and the conductive layer is stronger, and the protective layer can better protect the conductive layer. Moreover, with an increase of the specific surface area of the protective layer, the bonding force between the protective layer and the positive active material layer will be also increased. Therefore, compared with the current collector having no protective layer arranged thereon or having the upper protective layer made of metal, the current collector according to the embodiments of the present disclosure can further increase the bonding force with the positive active material layer, thus improving the overall strength of the battery.

In some embodiments, the positive current collector further includes a protective layer arranged on a surface of the conductive layer facing the insulation layer (i.e., a lower surface of the conductive layer), hereinafter referred to as a lower protective layer, and a material of the lower protective layer is selected from at least one of metal, metal oxide and conductive carbon.

Further, in some embodiments, the materials of the upper and lower protective layers are all metal oxides, so that the resistance of the positive current collector can be further increased, thereby improving the safety performance of the battery while further improving the service life and operating reliability of the positive current collector.

Further, in some embodiments, the thickness of the upper protective layer is greater than the thickness of the lower protective layer, that is, the thickness of the protective layer arranged on a surface of the conductive layer facing away from the insulation layer is greater than that of the protective layer arranged on a surface of the conductive layer facing towards the insulation layer.

When the thickness of the protective layer on the lower surface is sufficient to protect the conductive layer, the thickness of the protective layer on the lower surface can be minimized, thereby increasing the weight energy density of the battery.

Further, in some embodiments, the ratio of the thickness D3' of the lower protective layer to the thickness D3 of the upper protective layer is: $1/2\, D3 \leq D3' \leq 4/5\, D3$. The increase in the thickness of the lower protective layer has limited effect on the improvement for safety performance of the battery, and instead it will affect the weight energy density of the battery.

[Insulation Layer]

The insulation layer plays a role of supporting and protecting the conductive layer in the current collector of the embodiments of the present disclosure. The insulation layer has a thickness of D1 satisfying: $1\, \mu m \leq D1 \leq 20\, \mu m$. If the insulation layer is too thin, the insulation layer is likely to be broken during the process processing of the electrode plate or the like. If the insulation layer is too thick, the volume energy density of the battery using the current collector may be reduced.

The upper limit of the thickness D1 of the insulation layer can be 20 μm, 15 μm, 12 μm, 10 μm, or 8 μm, and the lower limit of the thickness D1 of the insulation layer can be 1 μm, 1.5 μm, 2 μm, 3 μm, 4 μm, 5 μm, 6 μm, or 7 μm. The thickness D1 of the insulation layer can be in a range consisting of any one upper limit and any one lower limit. Preferably, $2\, \mu m \leq D1 \leq 10\, \mu m$, and more preferably, $2\, \mu m \leq D1 \leq 6\, \mu m$.

In some embodiments, the material of the insulation layer is selected from one of an organic polymer insulation material, an inorganic insulation material, and a composite material. Further preferably, the composite material consists of an organic polymer insulation material and an inorganic insulation material.

The organic polymer insulation material is selected from a group consisting of polyamide (abbreviated as PA), polyethylene terephthalate (abbreviated as PET), polyimide (abbreviated as PI), and polyethylene (abbreviated as PE), polypropylene (abbreviated as PP), polystyrene (abbreviated as PS), polyvinyl chloride (abbreviated as PVC), acrylonitrile butadiene styrene copolymers (abbreviated as ABS), polybutylene terephthalate (abbreviated as PBT), poly-p-phenylene terephthamide (abbreviated as PPA), epoxy resin, polyformaldehyde (abbreviated as POM), phenol-formaldehyde resin, ethylene propylene rubber (abbreviated as PPE), polytetrafluoroethylene (abbreviated as PTFE), silicone rubber, polyvinylidene fluoride (abbreviated as PVDF), polycarbonate (abbreviated as PC), or a combinations thereof.

The inorganic insulation material is preferably at least one of aluminum oxide ($Al_2O_3$), silicon carbide (SiC), and silicon dioxide ($SiO_2$).

The composite material is preferably at least one of an epoxy resin glass fiber reinforced composite material and a polyester resin glass fiber reinforced composite material.

Preferably, the material of the insulation layer is selected from the organic polymer insulation materials. Since the density of the insulation layer is usually smaller than that of the metal, the current collector of the present disclosure can improve the weight energy density of the battery while improving safety performance of the battery. In addition, since the insulation layer can well support and protect the conductive layer arranged on the surface thereof; a breakage of the electrode plate, which is common in the conventional current collector, is unlikely to occur.

A second aspect of the embodiments of the present disclosure further provides an electrode plate comprising the current collector of the first aspect of the embodiments of the present disclosure and the electrode active material layer formed on the surface of the current collector.

Figure 9:
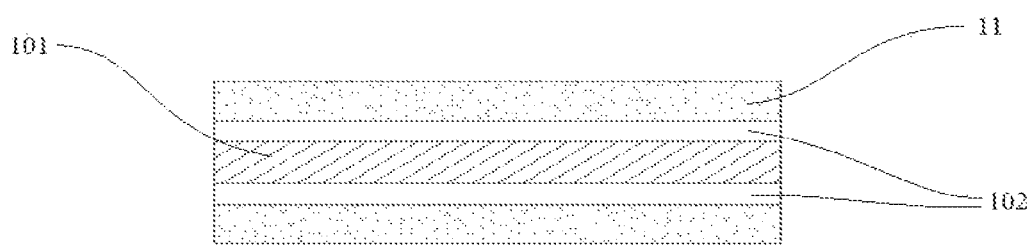
FIG. 9 is a structural schematic diagram of a positive electrode plate according to an embodiment of the present disclosure.
Figure 10:
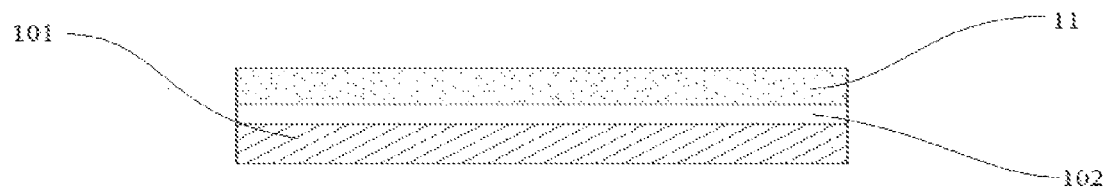
FIG. 10 is a structural schematic diagram of a positive electrode plate according to another embodiment of the present disclosure.

FIGS. 9 and 10 are structural schematic diagrams of a positive electrode plate according to embodiments of the present disclosure. As shown in FIGS. 9 and 10, the positive electrode plate 1 includes a positive current collector 10 and a positive active material layer 11 formed on a surface of the positive current collector 10. The positive current collector 10 includes a positive insulation layer 101 and one or two positive conductive layers 102 arranged in this order. There is one positive protective layer 103 (not shown) arranged on one side of each positive conductive layer 102, or there are two positive protective layers 103 (not shown) arranged on two sides of each positive conductive layer 102.

Figure 11:
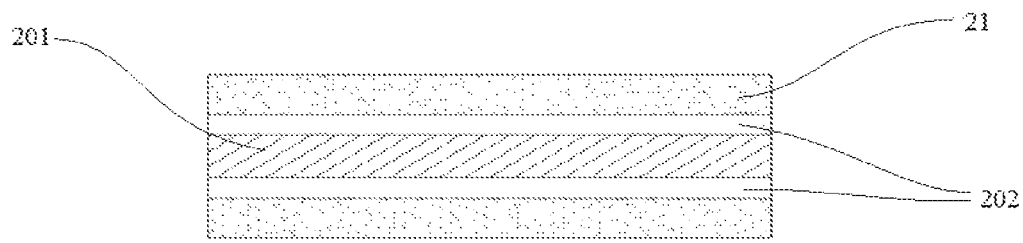
FIG. 11 is a structural schematic diagram of a negative electrode plate according to an embodiment of the present disclosure.
Figure 12:
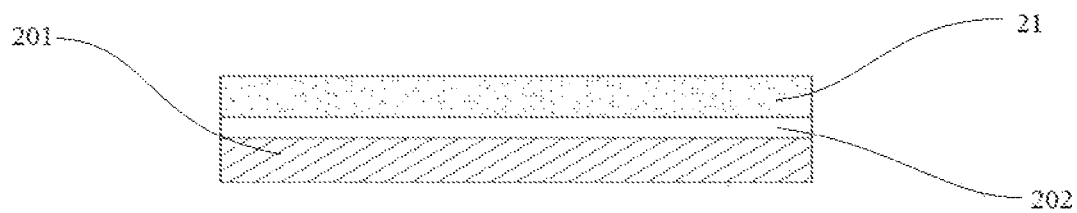
FIG. 12 is a structural schematic diagram of a negative electrode plate according to another embodiment of the present disclosure.

FIGS. 11 and 12 are structural schematic diagrams of a negative electrode plate according to embodiments of the present disclosure. As shown in FIGS. 11 and 12, the negative electrode plate 2 includes a negative current collector 20 and a negative active material layer 21 formed on a surface of the negative collector 20. The negative current collector 20 includes a negative insulation layer 201 and one or two negative conductive layers 202 arranged in this order. There is one negative protective layer 203 (not shown) arranged on one side of each negative conductive layer 202, or there are two negative protective layers 203 (not shown) arranged on two sides of each negative conductive layer 202.

As shown in FIGS. 1, 2, 5, and 6, when each of the both surfaces of the insulation layer is provided with a conductive layer, one or two protective layer(s) is/are provided on one or both surfaces of each conductive layer, and the active material is coated on both surfaces of the current collector, so as to obtain the positive and negative electrode plates, as shown in FIG. 9 and FIG. 11, respectively. The positive and negative electrode plates can be directly applied in a battery.

As shown in FIGS. 3, 4, 7, and 8, when only one surface of the insulation is provided with a conductive layer, one or two protective layer(s) is/are provided on one or both surfaces of the conductive layer, and the active material is coated on a surface of the current collector, so as to obtain the positive and negative electrode plates, as shown in FIG. 10 and FIG. 12, respectively. The positive and negative electrode plates can be applied in a battery after being bent.

An embodiment of the present disclosure further provides a battery including a positive electrode plate, a separator and a negative electrode plate.

The positive electrode plate and/or the negative electrode plate are the electrode plate of the above embodiments of the present disclosure. The battery according to the embodiments of the present disclosure may be in a wound type or a laminated type. The battery according to the present disclosure can also be one of a lithium ion secondary battery, a primary lithium battery, a sodium ion battery, and a magnesium ion battery. However, it is not limited to these batteries.

Further, an embodiment of the present disclosure further provides a battery including a positive electrode plate, a separator, and a negative electrode plate, and only the positive electrode plate is the positive electrode plate in the above embodiments.

Preferably, the positive electrode plate of the battery according to the present disclosure employs the above electrode plates of the present disclosure. The aluminum content in the conventional positive current collector is high, so when a short circuit occurs in the battery under the abnormal conditions, the heat generated at the short circuit point can initiate a violent aluminothermal reaction, thereby generating a large amount of heat and causing the explosion or other accidents of the battery. When the positive electrode plate of the battery employs the above electrode plates of the present disclosure, since the content of aluminum in the positive current collector is greatly reduced, the aluminothermal reaction can be avoided, thereby significantly improving safety performance of the battery.

Figure 13:
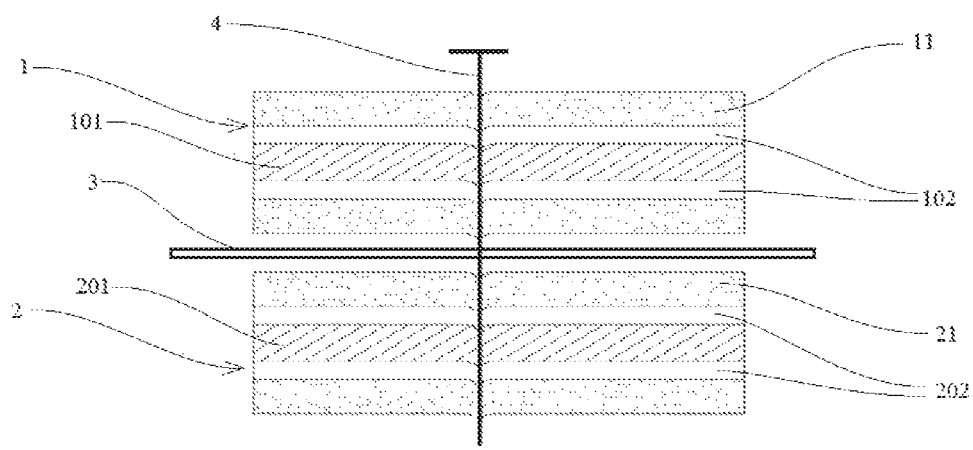
FIG. 13 is a schematic diagram showing a nailing experiment of the present disclosure.

In the present disclosure, a nailing experiment is used to simulate the abnormal conditions of the battery and observe a change of the battery after nailing. FIG. 13 is a schematic diagram of a nailing experiment of the present disclosure. For the sake of simplicity, the drawing merely shows that a nail 4 punctures one layer of positive electrode plate 1, one layer of separator 3 and one layer of negative electrode plate 2 of the battery. It should be noted that the nail 4 penetrates the entire battery in the actual nailing experiment. The entire battery generally includes a plurality of layers of positive electrode plate 1, separator 3, and negative electrode plate 2. When a short circuit occurs in the battery due to the nailing, the short circuit current is greatly reduced, and the heat generated during the short circuit is controlled within a range that the battery can fully absorb. Therefore, the heat generated at the position where the internal short circuit occurs can be completely absorbed by the battery, and the temperature rise of the battery is also very small, such that the damage on the battery caused by the short circuit can be limited to the nailing position, and only a "point break" can be formed without affecting the normal operation of the battery in a short time.

EMBODIMENTS

1. Preparation of Current Collector

An insulation layer having a certain thickness is selected, and a conductive layer having a certain thickness is formed on the surface of the insulation layer by means of vacuum evaporation, mechanical rolling or bonding, and the protective layer is formed by means of vapor deposition, in-situ formation or coating.

1.1 Formation of Conductive Layer

There are several manners to form the conductive layer as follows.

(1) The conditions of the vacuum evaporation for forming the conductive layer are as follows: the insulation layer is placed in a vacuum evaporation chamber after a surface cleaning treatment, a high-purity metal wire in a metal evaporation chamber is melted and evaporated at a high temperature in a range of 1600° C. to 2000° C., the evaporated metal passes through a cooling system in the vacuum evaporation chamber and is finally deposited on the surface of the insulation layer to form the conductive layer.

(2) The conditions of the mechanical rolling for forming the conductive layer are as follows: a foil of a material used for the conductive layer is placed in a mechanical roller, rolled to a predetermined thickness by applying a pressure in a range of 20 t to 40 t, and then placed on a surface of the insulation layer that has been subjected to a surface cleaning treatment, and finally the both are placed in the mechanical roller, so as to be tightly bonded by applying a pressure in a range of 30 t to 50 t.

(3) The conditions of the bonding for forming the conductive layer are as follows: a foil of a material used for the conductive layer is placed in a mechanical roller, rolled to a predetermined thickness by applying a pressure in a range of 20 t to 40 t, and then a mixed solution of PVDF and NMP is applied on a surface of the insulation layer that has been subjected to a surface cleaning treatment, and finally the conductive layer having the above predetermined thickness is bonded to the surface of the insulation layer and dried at 100° C.

1.2 Formation of Protective Layer

There are several following manners to form a protective layer as follows.

(1) A protective layer is firstly arranged on a surface of the insulation layer by means of vapor deposition or coating, and then a conductive layer having a certain thickness is formed on the protective layer disposed on the insulation layer by means of vacuum evaporation, mechanical rolling or bonding, so as to prepare a current collector having a lower protective layer (the protective layer is located between the insulation layer and the conductive layer). In addition, alternatively, on the basis of the above, an upper protective layer is further formed on a surface of the conductive layer facing away from the insulation layer by means of vapor deposition, in-situ formation or coating, so as to prepare a current collector having an upper protective layer and a lower protective layer (which are located on two opposite surfaces of the conductive layer).

(2) A protective layer is firstly formed on a surface of the conductive layer by means of vapor deposition, in-situ formation, or coating, and then the conductive layer provided with the above protective layer is arranged on a surface of the insulation layer by means of mechanical rolling or bonding, and the protective layer is arranged between the insulation layer and the conductive layer, so as to prepare a current collector having a lower protective layer (the protective layer is located between the insulation layer and the conductive layer). In addition, alternatively, on the basis of the above, an upper protective layer is further formed on a surface of the conductive layer facing away from the insulation layer by means of vapor deposition method, in-situ formation, or coating, so as to prepare a current collector having an upper protective layer and a lower protective layer (which are located on two opposite surfaces of the conductive layer);

(3) A protective layer is firstly formed on a surface of the conductive layer by means of vapor deposition, in-situ formation, or coating, and then the conductive layer provided with the above protective layer is arranged on a surface of the insulation layer by means of mechanical rolling or bonding, and the protective layer is arranged on a surface of the conductive layer facing away from the insulation layer, so as to prepare a current collector having an upper protective layer (which is located on the surface of the conductive layer facing away from the insulation layer);

(4) A protective layer is firstly formed on two surfaces of the conductive layer by means of vapor deposition, in-situ formation, or coating, and then the conductive layer provided with the above protective layer is arranged on the surface of the insulation layer by means of mechanical rolling or bonding, so as to prepare a current collector having an upper protective layer and a lower protective layer (which are located on two opposite surfaces of the conductive layer);

(5) A conductive layer is formed on the surface of an insulation layer, and then an upper protective layer is formed on the surface of the conductive layer facing away from the insulation layer by means of vapor deposition, in-situ formation, or coating, so as to prepare a current collector having an upper protective layer (which is located on the surface of the conductive layer facing away from the insulation layer).

In the embodiments of preparation, the vapor deposition is vacuum evaporation, the in-situ formation is in-situ passivation, and the coating is blade coating.

The conditions of the vacuum evaporation for forming the protective layer are as follows: a sample is placed in a vacuum evaporation chamber after a surface cleaning treatment, a material of the protective layer in the evaporation chamber is melted and evaporated at a high temperature in a range of 1600° C. to 2000° C., and the evaporated material of the protective layer passes through a cooling system in the vacuum evaporation chamber and is finally deposited on a surface of the sample, so as to form the protective layer.

The conditions of the in-situ passivation are as follows: the conductive layer is placed in a high-temperature oxidizing environment, the temperature is controlled within a range of 160° C. to 250° C., and the oxygen supply is maintained in the high-temperature environment, and processing time is 30 min, so as to form a protective layer of metal oxide.

The conditions of the gravure coating are as follows: a material of the protective layer and NMP are stirred and mixed, then the slurry of the above material of the protective layer (solid material content is 20% to 75%) is coated on a surface of the sample, the thickness of the coating is controlled by a gravure roll, and finally the coating is dried at 100 to 130° C.

3. Preparation of electrode plate:

The positive electrode slurry or the negative electrode slurry is coated on a surface of the current collector by a conventional coating process of battery and dried at 100° C., so as to obtain a positive electrode plate or negative electrode plate.

Conventional positive electrode plate: the current collector is an Al foil having a thickness of 12 µm, and the electrode active material layer is a layer of the ternary material (NCM) having a certain thickness.

Conventional negative electrode plate: the current collector is a Cu foil having a thickness of 8 μm, and the electrode active material layer is a graphite material layer having a certain thickness.

The specific parameters of the prepared current collector and electrode plates thereof are shown in Table 1 and Table 2. In Table 1, there is no protective layer in the current collectors of Electrode plates 1 to 6. In Table 2, "Electrode plate 3-1" indicates that the conductive layer is the same as the conductive layer of Electrode plate 3, and so on. "Electrode plate 6-4" indicates that the conductive layer is the same as the conductive layer of Electrode plate 6, and so on.

4. Preparation of the Battery:

A positive electrode plate (compaction density: 3.4 g/cm$^3$), a PP/PE/PP separator and a negative electrode plate (compaction density: 1.6 g/cm$^3$) are wound together to form a bare cell by a conventional battery manufacturing process, then the bare cell is placed into a battery case, an electrolyte (EC:EMC in a volume ratio of 3:7; LiPF6, 1 mol/L) is injected into the case, followed by sealing, formation, and the like, so as to obtain a lithium ion battery.

Specific compositions of the lithium ion battery prepared in the embodiments of the present disclosure and the lithium ion battery of the comparative examples are shown in Table 3.

TABLE 1

| Electrode plate No. | Insulation layer | | Conductive layer | | Formation of Conductive layer | Electrode active material layer | |
|---|---|---|---|---|---|---|---|
| | Material | D1 | Material | D2 | | Material | 厚度 |
| Electrode plate 1# | PI | 6 μm | Al | 300 nm | Vaccum evaporation | NCM | 55 μm |
| Electrode plate 2# | PET | 5 μm | Al | 500 nm | Vaccum evaporation | LCO | 55 μm |
| Electrode plate 3# | PI | 2 μm | Al | 800 nm | Vaccum evaporation | NCM | 55 μm |
| Electrode plate 4# | PET | 10 μm | Al | 1 μm | Vaccum evaporation | NCM | 55 μm |
| Electrode plate 5# | PET | 8 μm | Ni | 1.5 μm | Vaccum evaporation | Graphite | 70 μm |
| Electrode plate 6# | PI | 5 μm | Al | 2 μm | Vaccum evaporation | NCM | 55 μm |

TABLE 2

| Electrode plate No. | Lower protection layer | | Upper protection layer | | Formation of protective layer |
|---|---|---|---|---|---|
| | Material | D3' | Material | D3 | |
| Electrode plate 3-1# | / | / | Nickle oxide | 1 nm | Vaccum evaporation |
| Electrode plate 3-2# | / | / | Nickle oxide | 10 nm | Vaccum evaporation |
| Electrode plate 3-3# | / | / | Aluminum oxide | 50 nm | Vaccum evaporation |
| Electrode plate 6-4# | / | / | Nickle oxide | 200 nm | Vaccum evaporation |
| Electrode plate 3-5# | Nickle | 5 nm | Nickle oxide | 10 nm | Vaccum evaporation |
| Electrode plate 3-6# | Nickle oxide | 8 nm | Nickle oxide | 10 nm | Vaccum evaporation |
| Electrode plate 3-7# | Nickle oxide | 20 nm | Nickle oxide | 50 nm | Vaccum evaporation |
| Electrode plate 6-8# | Nickle oxide | 30 nm | Nickle oxide | 50 nm | Vaccum evaporation |
| Electrode plate 6-9# | Nickle oxide | 50 nm | Nickle oxide | 100 nm | Vaccum evaporation |
| Electrode plate 6-10# | Aluminum oxide | 100 nm | Nickle oxide | 200 nm | Vaccum evaporation |

The symbol "/" indicates that no protective layer is arranged.

TABLE 3

| Battery No. | Composition of electrode plate | |
|---|---|---|
| Battery 1# | Conventional positive electrode plate | Conventional negative electrode plate |
| Battery 2# | Electrode plate 3# | Conventional negative electrode plate |
| Battery 3# | Electrode plate 6# | Conventional negative electrode plate |
| Battery 4# | Electrode plate 3-1# | Conventional negative electrode plate |
| Battery 5# | Electrode plate 3-2# | Conventional negative electrode plate |
| Battery 6# | Electrode plate 3-3# | Conventional negative electrode plate |
| Battery 7# | Electrode plate 6-4# | Conventional negative electrode plate |
| Battery 8# | Electrode plate 3-5# | Conventional negative electrode plate |
| Battery 9# | Electrode plate 3-6# | Conventional negative electrode plate |
| Battery 10# | Electrode plate 3-7# | Conventional negative electrode plate |
| Battery 11# | Electrode plate 6-8# | Conventional negative electrode plate |
| Battery 12# | Electrode plate 6-9# | Conventional negative electrode plate |
| Battery 13# | Electrode plate 6-10# | Conventional negative electrode plate |

EXPERIMENTAL EXAMPLES

1. Test Method of the Batteries:

A method for testing cycle life of the lithium ion battery was performed as follows.

A lithium ion battery was charged and discharged at 25° C. and 45° C. respectively, that is, it was firstly charged with a current of 1 C to a voltage of 4.2V, then discharged with a current of 1 C to a voltage of 2.8V, and the discharge capacity after a first cycle was recorded; and the battery was subjected to 1000 cycles of 1 C/1 C charging-discharging, and the discharge capacity of the battery after a $1000^{th}$ cycle was recorded. A capacity retention rate after the $1000^{th}$ cycle was obtained by dividing the discharge capacity after the $1000^{th}$ cycle by the discharge capacity after the first cycle.

The experimental results are shown in Table 4.

2. Test methods of one-time nailing experiment and six consecutive nailing experiment:

(1) One-time nailing experiment: a battery that had been fully charged was fixed, a steel needle with a diameter of 8 mm penetrates punctured through the battery at a speed of 25 mm/s at room temperature and remained in the battery, and the battery was observed and measured after the nailing was finished.

(2) Six-time nailing experiment: a battery that had been fully charged was fixed, six steel needles with a diameter of 8 mm rapidly punctured through the battery successively at a speed of 25 mm/s at room temperature and remained in the battery, and the battery was observed and measured after the nailing was finished.

(3) Measurement of battery temperature: a multichannel thermometer was used, and the temperature-sensing wires were respectively attached on geometric centers of a nail-inserting surface and an opposite surface of the battery to be nailed; after the nailing was finished, temperature of the battery was measured and tracked for 5 minutes, and the temperature of the battery at the end of the 5 minutes was recorded.

(4) Measurement of battery voltage: positive and negative electrodes of each battery to be nailed were connected to test terminals of an internal resistance instrument; after the nailing was finished, a voltage of each battery was measured and tracked for 5 minutes, and the voltage of the battery at the end of 5 minutes was recorded.

The data of the recorded battery temperatures and voltages are shown in Table 5.

TABLE 4

| Battery No. | Capacity retention ratio after the $1000^{th}$ cycle | |
|---|---|---|
| | 25° C. | 45° C. |
| Battery 1# | 89.2% | 86.5% |
| Battery 2# | 86.5% | 80.7% |
| Battery 3# | 86.8% | 80.8% |
| Battery 4# | 87.7% | 81.9% |
| Battery 5# | 88.2% | 83.2% |
| Battery 6# | 88.7% | 86.2% |
| Battery 7# | 86.9% | 80.5% |
| Battery 8# | 88.2% | 82.8% |
| Battery 9# | 88.5% | 85.2% |
| Battery 10# | 88.7% | 85.3% |
| Battery 11# | 88.6% | 85.7% |
| Battery 12# | 87.9% | 83.5% |
| Battery 13# | 89.1% | 86.1% |

TABLE 5

| | One-time nailing experiment | | Six-time consecutive nailing experiment | |
|---|---|---|---|---|
| Battery No. | Battery temperature rise (° C.) | Battery voltage (V) | Battery temperature rise (° C.) | Battery voltage (V) |
| Battery 1# | 500 | 0 | N/A | N/A |
| Battery 2# | 6.0 | 4.10 | 6.5 | 4.09 |
| Battery 3# | 15.2 | 3.85 | 15.7 | 3.84 |
| Battery 4# | 5.4 | 4.12 | 3.6 | 4.08 |
| Battery 5# | 4.9 | 4.14 | 3.4 | 4.08 |
| Battery 6# | 4.3 | 4.11 | 3.4 | 4.09 |
| Battery 7# | 5.5 | 4.05 | 5.1 | 4.04 |
| Battery 8# | 3.9 | 4.12 | 4.1 | 4.12 |
| Battery 9# | 5.1 | 4.13 | 4.0 | 4.04 |
| Battery 10# | 4.4 | 4.11 | 3.6 | 4.05 |
| Battery 11# | 5.6 | 4.14 | 3.8 | 4.08 |
| Battery 12# | 5.3 | 4.12 | 3.7 | 4.09 |
| Battery 13# | 4.7 | 4.12 | 4.1 | 4.12 |

Note:
"N/A" indicates that thermal runaway and damage happened immediately after one steel needle punctured through the battery.

Figure 14:
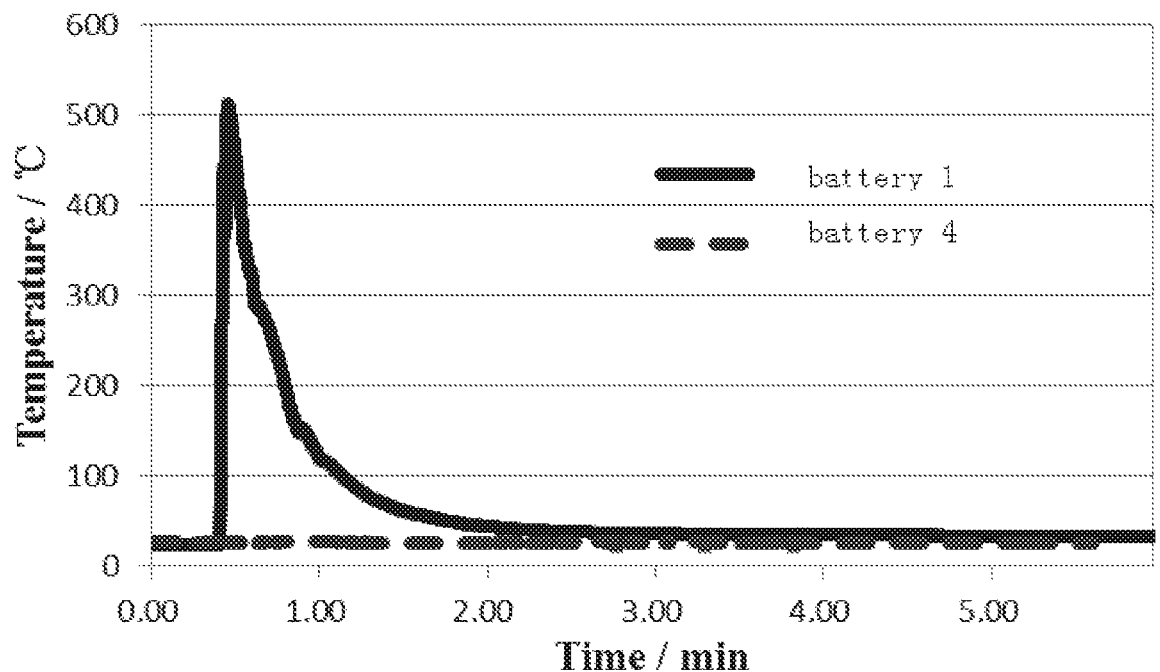
FIG. 14 is a schematic graph of temperatures of Battery 1# and Battery 4# after the nailing test.
Figure 15:
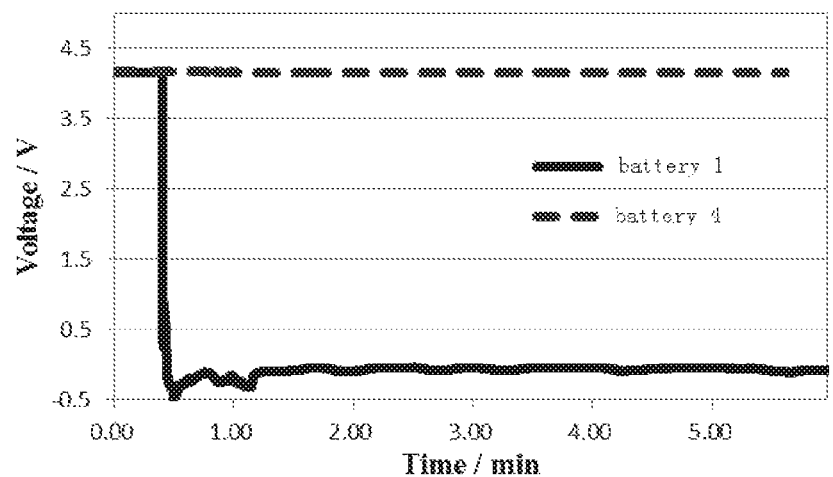
FIG. 15 is a schematic graph of voltages of Battery 1# and Battery 4# after the nailing test.

The graph of temperature of Battery 1# and Battery 4# with time is shown in FIG. 14, and the graph of voltage with time is shown in FIG. 15.

According to the results in Table 4, compared with Battery 1# using the conventional positive electrode plate and the conventional negative electrode plate, the battery using the current collector according to the embodiments of the present disclosure has good cycle performance, which is equivalent to the cycle performance of the conventional battery. This shows that the current collectors according to the embodiments of the present disclosure do not have any significant adverse effects on the resulting electrode plates and batteries. Compared with a current collector having no protective layer, the battery prepared by the current collector provided with the protective layer can have a further improved capacity retention rate, indicating a better reliability of the battery.

In addition, the current collector according to the embodiments of the present disclosure can significantly improve the safety performance of the lithium ion battery. From the results in Table 5 and FIGS. 14-15, the battery temperature of Battery 1 # not using the current collector of the embodiments of the present disclosure at the moment of nailing rose suddenly by hundreds of centigrade degree and the voltage thereof suddenly dropped to zero. This shows that the internal short circuit occurred in the battery at the moment of nailing, a large amount of heat was generated, a thermal runaway and damage of the battery instantly occurred, such that the battery is unable to continue operating. Furthermore, due to the thermal runaway and damage of the battery occurring immediately after the first steel needle punctured into the battery, it is impossible to perform the continuous nailing on this type of battery by using six steel needles.

However, with Batteries 4#-13# using the current collector according to the embodiments of the present disclosure, the temperature rise of the battery can basically be controlled under 6° C., the voltages are substantially constant, and the battery can operate normally, no matter in one-time nailing experiment or in six-time continuous nailing experiment. Compared with Batteries 2# and 3#, it can be seen that the battery with metal oxide protective layer has better safety performance.

It can be seen that, in the event of an internal short circuit in the battery, the current collector according to the embodiments of the present disclosure can greatly reduce the heat generation caused by the short circuit, thereby improving the safety performance of the battery. In addition, the damage on the battery caused by the short circuit can be limited to a "point", and thus merely forms a "point break", without affecting the normal operation of the battery in a short time.

The preferable embodiments of the present disclosure are disclosed above but are not used to limit the claims. Those skilled in the art may make possible changes and modifications without departing from the concept of the present disclosure. Therefore, the protection scope of the present disclosure is defined by the attached claims.

What is claimed is:

1. A current collector, comprising: an insulation layer, a conductive layer, a first protective layer and a second protective layer,
    wherein the insulation layer is used to support the conductive layer,
    wherein the conductive layer is used to support an electrode active material layer and located above at least one surface of the insulation layer, and the conductive layer has a thickness of D2 satisfying 300 nm≤D2≤2 μm, and
    wherein the first protective layer is arranged on a surface of the conductive layer facing towards the insulation layer, and the first protective layer is made of a material selected from a group consisting of metal, metal oxide, conductive carbon, or combinations thereof, the metal is selected from a group consisting of nickel, chromium, nickel-based alloy, copper-based alloy, or combinations thereof, and the metal oxide is selected from a group consisting of aluminum oxide, cobalt oxide, chromium oxide, nickel oxide, or combinations thereof, and the conductive carbon is selected from a group consisting of carbon black, carbon nanotube, acetylene black, graphene, or combinations thereof,
    the second protective layer is arranged on a surface of the conductive layer facing away from the insulation layer, the second protective layer is made of a material selected from a group consisting of metal, metal oxide, conductive carbon, or combinations thereof, the metal is selected from a group consisting of nickel, chromium, nickel-based alloy, copper-based alloy, or combinations thereof, and the metal oxide is selected from a group consisting of aluminum oxide, cobalt oxide, chromium oxide, nickel oxide, or combinations thereof, and the conductive carbon is selected from a group consisting of carbon black, carbon nanotube, acetylene black, graphene, or combinations thereof,
    wherein the first protective layer has a thickness of D3', the second protective layer has a thickness of D3, the thickness D3 of the second protective layer is larger than the thickness D3' of the first protective layer, and 1/2 D3≤D3'≤4/5 D3.

2. The current collector according to claim 1, wherein 500 nm≤D2≤1.5 μm.

3. The current collector according to claim 1, wherein the conductive layer is made of a material selected from a group consisting of a metallic conductive material, and
    wherein the metallic conductive material is selected from a group consisting of aluminum, copper, titanium, silver, aluminum zirconium alloy, or combinations thereof.

4. The current collector according to claim 1, wherein the insulation layer has a thickness of D1 satisfying 1 μm≤D1≤20 μm.

5. The current collector according to claim 1, wherein the insulation layer is made of an organic polymer insulation material, and the organic polymer insulation material is selected from a group consisting of polyamide, polyethylene terephthalate, polyimide, polyethylene, polypropylene, polystyrene, polyvinyl chloride, acrylonitrile-butadiene-styrene copolymer, polybutylene terephthalate, poly-p-phenylene terephthalamide, ethylene propylene rubber, polyformaldehyde, epoxy resin, phenol-formaldehyde resin, polytetrafluoroethylene, polyvinylidene fluoride, silicone rubber, polycarbonate, or combinations thereof.

6. The current collector according to claim 1, wherein the current collector is a positive current collector, and the second protective layer is made of metal oxide, and
    wherein the metal oxide is selected from a group consisting of aluminum oxide, cobalt oxide, chromium oxide, nickel oxide, or combinations thereof.

7. The current collector according to claim 1,
    wherein D3≤1/10 D2 and 1 nm≤D3≤200 nm, and
    wherein g D3'≤1/10 D2 and 1 nm≤D3'≤200 nm.

8. The current collector according to claim 1, wherein the insulation layer has a thickness of D1 satisfying 2 μm≤D1≤10 μm.

9. The current collector according to claim 1, wherein the insulation layer has a thickness of D1 satisfying 2 μm≤D1≤6 μm.

10. The current collector according to claim 1,
    wherein 10 nm≤D3≤50 nm, and 10 nm≤D3'≤50 nm.

11. An electrode plate, comprising a current collector and an electrode active material layer formed on a surface of the current collector,
    wherein the current collector, comprises: an insulation layer, a conductive layer, a first protective layer and a second protective layer,
    wherein the insulation layer is used to support the conductive layer,
    wherein the conductive layer is used to support the electrode active material layer and located above at least one surface of the insulation layer, and the conductive layer has a thickness of D2 satisfying 300 nm ≤D2≤2 μm, and
    wherein the first protective layer is arranged on a surface of the conductive layer facing towards the insulation layer, and the first protective layer is made of a material selected from a group consisting of metal, metal oxide, conductive carbon, or combinations thereof, the metal is selected from a group consisting of nickel, chromium, nickel-based alloy, copper-based alloy, or combinations thereof, and the metal oxide is selected from a group consisting of aluminum oxide, cobalt oxide, chromium oxide, nickel oxide, or combinations thereof, and the conductive carbon is selected from a group consisting of carbon black, carbon nanotube, acetylene black, graphene, or combinations thereof,
    the second protective layer is arranged on a surface of the conductive layer facing away from the insulation layer, the second protective layer is made of a material selected from a group consisting of metal, metal oxide, conductive carbon, or combinations thereof, the metal is selected from a group consisting of nickel, chromium, nickel-based alloy, copper-based alloy, or combinations thereof, and the metal oxide is selected from a group consisting of aluminum oxide, cobalt oxide, chromium oxide, nickel oxide, or combinations thereof, and the conductive carbon is selected from a group consisting of carbon black, carbon nanotube, acetylene black, graphene, or combinations thereof, wherein the first protective layer has a thickness of D3', the second protective layer has a thickness of D3, the thickness D3 of the second protective layer is larger than the thickness D3' of the first protective layer, and 1/2 D3≤D3'≤4/5 D3.

12. The electrode plate according to claim 11, wherein the current collector is a positive current collector, and the second protective layer is made of metal oxide, and wherein the metal oxide is selected from a group consisting of aluminum oxide, cobalt oxide, chromium oxide, nickel oxide, or combinations thereof.

13. The electrode plate according to claim 12, wherein the first protective layer is made of a material selected from a group consisting of metal, metal oxide, conductive carbon, or combinations thereof, and wherein the metal is selected from a group consisting of nickel, chromium, nickel-based alloy, copper-based alloy, or combinations thereof the metal oxide is selected from a group consisting of aluminum oxide, cobalt oxide, chromium oxide, nickel oxide, or combinations thereof; and the conductive carbon is selected from a group consisting of carbon black, carbon nanotube, acetylene black, graphene, or combinations thereof.

14. The electrode plate according to claim 11,
wherein D3≤1/10 D2 and 1 nm≤D3≤200 nm, and
wherein g D3'≤1/10 D2 and 1 nm≤D3'≤200 nm.

15. The current collector according to claim 11,
wherein 10 nm≤D3≤50 nm, and 10 nm≤D3'≤50 nm.

16. A battery, comprising a positive electrode plate, a separator, and a negative electrode plate, wherein the positive electrode plate and/or the negative electrode plate is an electrode plate, wherein the electrode plate comprises a current collector and an electrode active material layer formed on a surface of the current collector, wherein the current collector, comprises: an insulation layer, a conductive layer, a first protective layer and a second protective layer, wherein the insulation layer is used to support the conductive layer, wherein the conductive layer is used to support the electrode active material layer and located above at least one surface of the insulation layer, and the conductive layer has a thickness of D2 satisfying 300 nm≤D2≤2 μm, and wherein the first protective layer is arranged on a surface of the conductive layer facing towards the insulation layer, and the first protective layer is made of a material selected from a group consisting of metal, metal oxide, conductive carbon, or combinations thereof, the metal is selected from a group consisting of nickel, chromium, nickel-based alloy, copper-based alloy, or combinations thereof, and the metal oxide is selected from a group consisting of aluminum oxide, cobalt oxide, chromium oxide, nickel oxide, or combinations thereof, and the conductive carbon is selected from a group consisting of carbon black, carbon nanotube, acetylene black, graphene, or combinations thereof, the second protective layer is arranged on a surface of the conductive layer facing away from the insulation layer, the second protective layer is made of a material selected from a group consisting of metal, metal oxide, conductive carbon, or combinations thereof, the metal is selected from a group consisting of nickel, chromium, nickel-based alloy, copper-based alloy, or combinations thereof, and the metal oxide is selected from a group consisting of aluminum oxide, cobalt oxide, chromium oxide, nickel oxide, or combinations thereof, and the conductive carbon is selected from a group consisting of carbon black, carbon nanotube, acetylene black, graphene, or combinations thereof, wherein the first protective layer has a thickness of D3', the second protective layer has a thickness of D3, the thickness D3 of the second protective layer is larger than the thickness D3' of the first protective layer, and 1/2 D3≤D3'≤4/5 D3.

17. The battery according to claim 16, wherein the current collector is a positive current collector, and the second protective layer is made of metal oxide, and wherein the metal oxide is selected from a group consisting of aluminum oxide, cobalt oxide, chromium oxide, nickel oxide, or combinations thereof.

18. The battery according to claim 17, wherein the protective first layer is made of a material selected from a group consisting of metal, metal oxide, conductive carbon, or combinations thereof, and wherein the metal is selected from a group consisting of nickel, chromium, nickel-based alloy, copper-based alloy, or combinations thereof; the metal oxide is selected from a group consisting of aluminum oxide, cobalt oxide, chromium oxide, nickel oxide, or combinations thereof; and the conductive carbon is selected from a group consisting of carbon black, carbon nanotube, acetylene black, graphene, or combinations thereof.

19. The battery according to claim 16,
wherein D3≤1/10 D2 and 1 nm≤D3≤200 nm, and
wherein g D3'≤1/10 D2 and 1 nm≤D3'≤200 nm.

20. The current collector according to claim 16,
wherein 10 nm≤D3≤50 nm, and 10 nm≤D3'≤50 nm.

* * * * *